Figure 4:
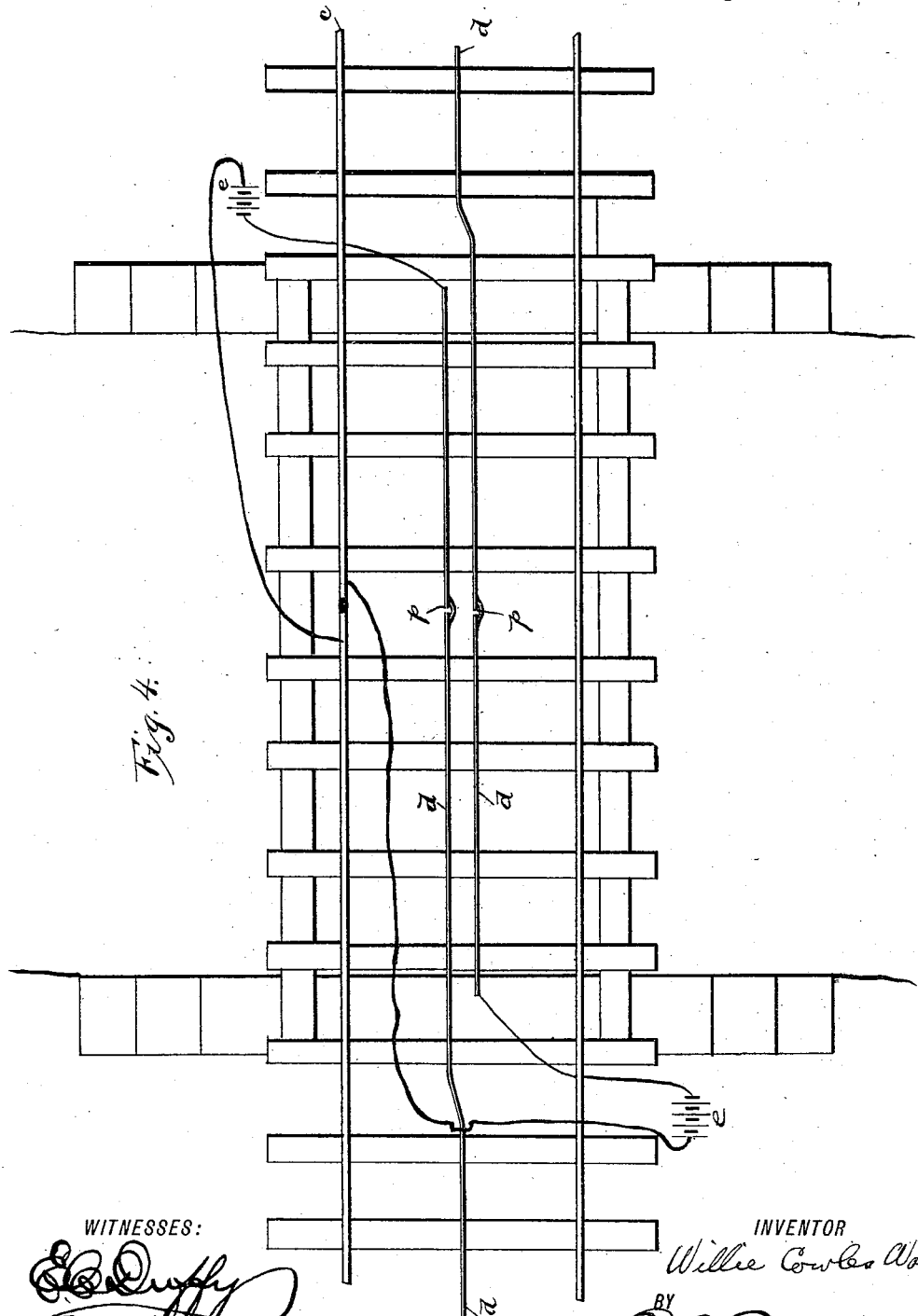

(No Model.) 3 Sheets—Sheet 1.
W. C. WALTER, Dec'd.
S. L. WALTER, Executrix.
ELECTRIC RAILWAY SIGNAL.
No. 451,999. Patented May 12, 1891.
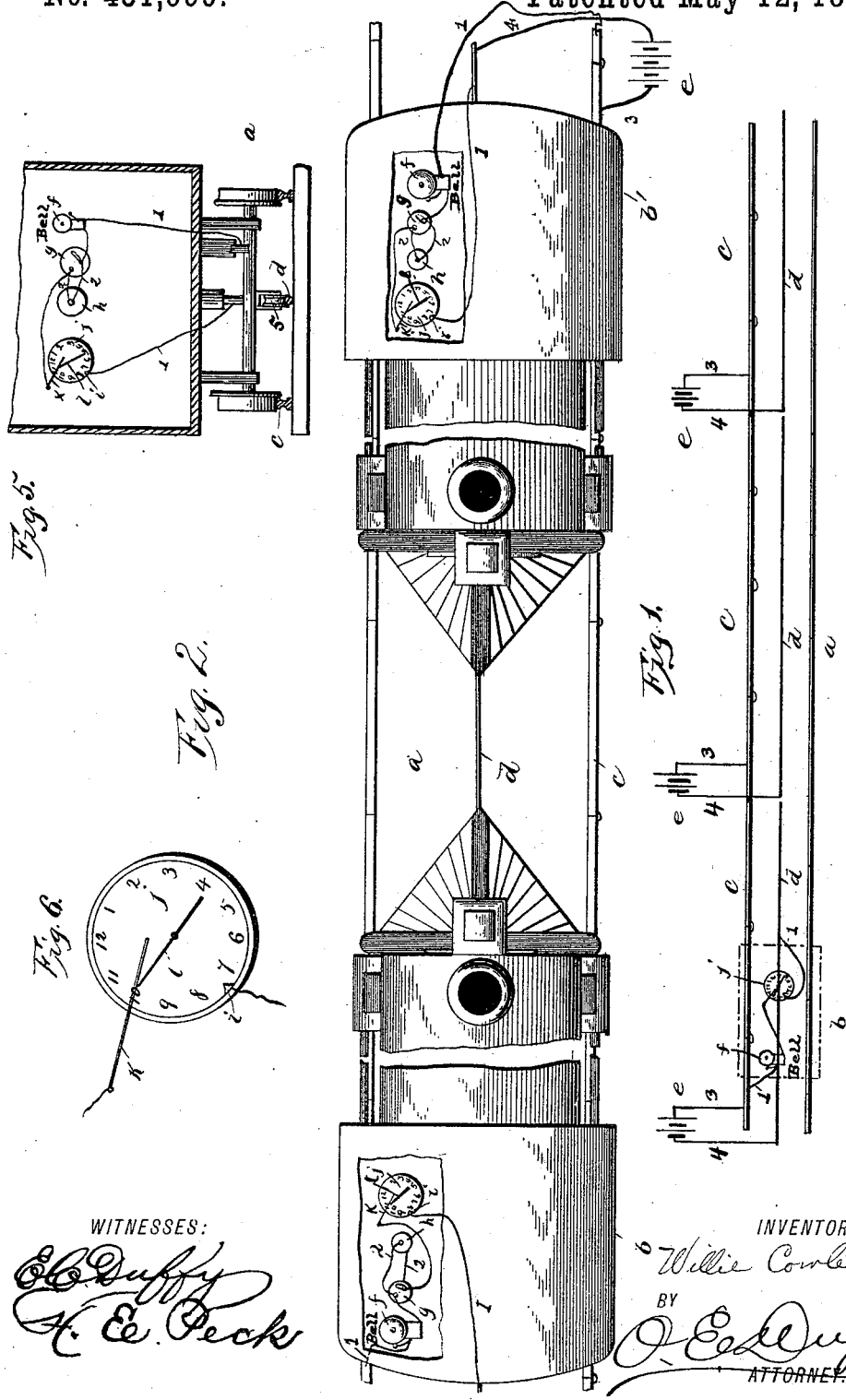
WITNESSES:
INVENTOR
Willie Cowles Walter
BY
ATTORNEY (No Model.) 3 Sheets—Sheet 2.
W. C. WALTER, Dec'd.
S. L. WALTER, Executrix.
ELECTRIC RAILWAY SIGNAL.
No. 451,999. Patented May 12, 1891.
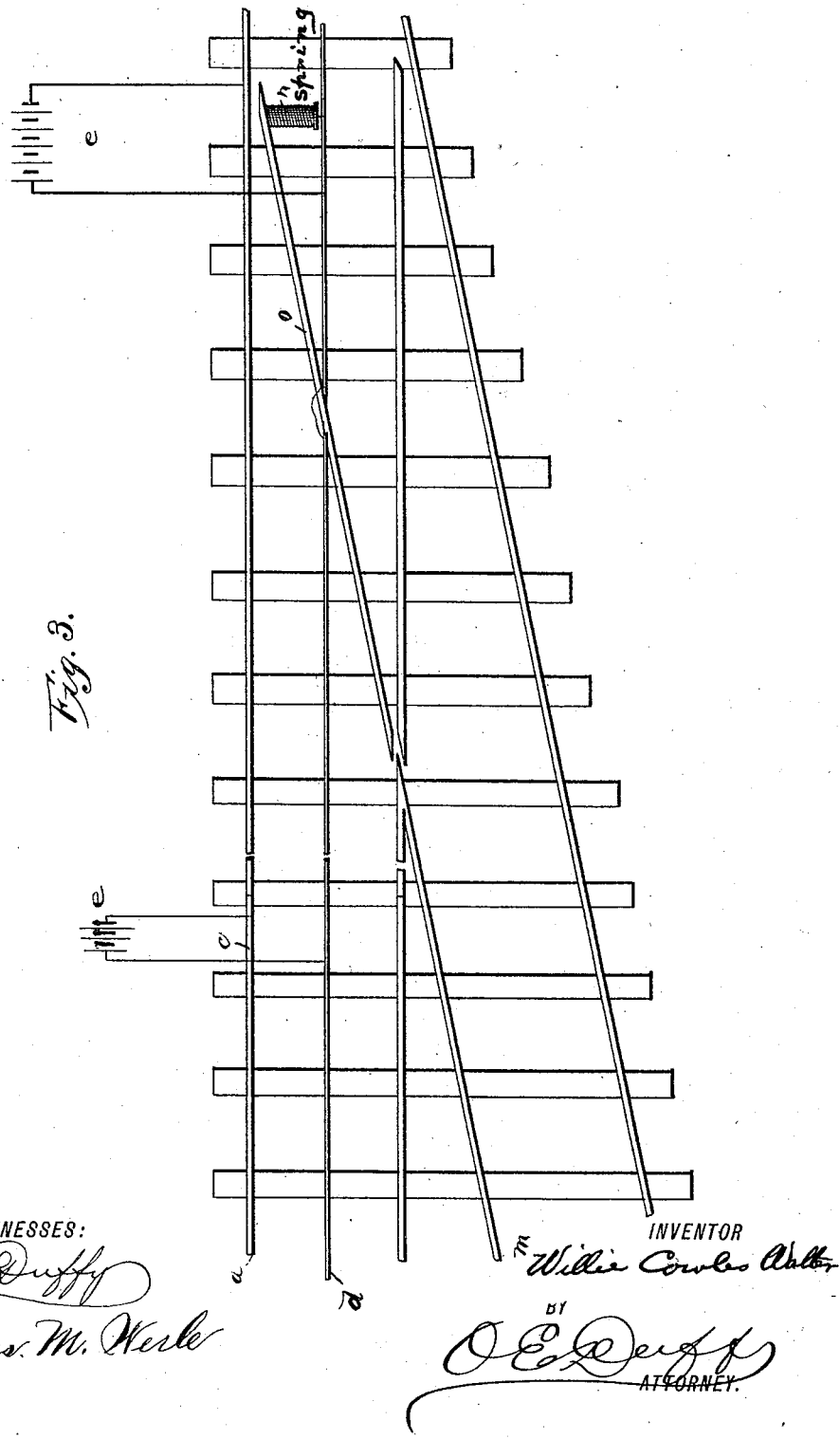

(No Model.)

W. C. WALTER, Dec'd.
S. L. WALTER, Executrix.
ELECTRIC RAILWAY SIGNAL.

No. 451,999. Patented May 12, 1891.

WITNESSES:
INVENTOR
BY
ATTORNEY.

United States Patent Office.

WILLIE COWLES WALTER, OF RICHMOND, VIRGINIA; SOPHIA LEE WALTER EXECUTRIX OF SAID WILLIE COWLES WALTER, DECEASED.

ELECTRIC RAILWAY-SIGNAL.

SPECIFICATION forming part of Letters Patent No. 451,999, dated May 12, 1891.

Application filed November 23, 1889. Serial No. 331,342. (No model.)

*To all whom it may concern:*

Be it known that I, WILLIE COWLES WALTER, of Richmond, in the county of Henrico and State of Virginia, have invented certain new and useful Improvements in Electric Railway-Signals; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

This invention relates to certain improvements in electric railway-signals; and the object and nature of the invention will be more fully described and particularly set forth hereinafter.

Referring to the accompanying drawings, Figure 1 is a diagrammatical view of the entire system without the transmitting breaker and maker. Fig. 2 is a plan of a railroad-track, showing two approaching vehicles in diagram on the same. Fig. 3 is a plan of a switch. Fig. 4 is a plan of a bridge. Fig. 5 is a section of the vehicle, showing the signaling devices thereof. Fig. 6 is an enlarged detail of the continuously-operating circuit maker and breaker.

In the drawings, the reference-letter $a$ indicates a railroad-track, and $b\ b'$ indicate two vehicles thereon. The series of rails on one side of the track are electrically connected to form a conductor $c$ along the track, which rail conductor is divided into blocks or sections, each of a suitable length. Another conductor $d$ extends along the track, preferably between the rails, and is secured to and insulated from the sleepers or other supports, and this conductor is broken into sections corresponding to the blocks or sections of the rail conductor. These two conductors are insulated from each other and from the ground, and the sections or blocks of each conductor are non-communicating or insulated from each other. Each block or corresponding pair of conductor-sections $c\ d$ is provided with a station having a battery or other source of electricity $e$, one pole of which is connected by connection 3 with an end of conductor $c$, and the other pole is connected by connection 4 with the corresponding end of the conductor $d$, so that if said two conductor-sections are electrically connected at any point a circuit will be closed through said sections and the battery. These blocks or sections are preferably of such length as to extend from one station to another, and the batteries can be located in the station-buildings.

The vehicles or locomotives $b\ b'$ are each provided with a brush or contact 5, traveling on the central conductor $d$, and in electrical contact therewith, and with a brush or other means whereby a circuit in the car can be connected with the rail conductor $c$ through an axle and wheel of the vehicle. The contact traveling on the central conductor is connected with a wheel-axle of the vehicle by means of the circuit 1 in the vehicle, which circuit includes an electric bell or alarm $f$ and a circuit-closer or switch $g$, whereby the connection between the two signal-conductors can be broken in the car.

A push-button $h$ or other maker and breaker, such as a Morse key, is located in the vehicle, and by means of the short circuit 2 is connected with the circuit 1 on both sides of the circuit-closer $g$, so that when it is desired to use the push-button the closer $g$ can be thrown open and the circuit will be made through line 2 and the push-button.

From the foregoing it will be observed that as soon as the vehicle reaches a track thus equipped a circuit is closed through the car and the bell rings continuously if everything is normal and as it should be; but if two approaching or receding vehicles are on the same block the circuit will be closed through but one of the vehicles, (the vehicle nearest to the source of electricity of that block,) while the other vehicle will be shut off from the source and its alarm will stop ringing, thereby notifying the engineer of danger ahead in time to stop his train. It will be observed that the alarm in each locomotive is always normally ringing, and that the engineer is notified that there is something wrong when the alarm stops sounding, and it should be further observed that the source of current is not carried by and located in the locomotive-circuit, but is located in stations or depots easy of access, and is directly connected to the signal line conductors, so that said conductors c d form two parallel terminals of the battery.

Each vehicle is preferably provided with an automatic circuit maker and breaker consisting of a stationary contact-point i, located on the face of a clock j in the engineer's cab and connected in the main circuit 1, and a spring contact or arm k, constantly tending to engage said stationary point and connected with and forming a terminal of said main circuit, so that the main circuit in the vehicle will be closed between said two points when they are in contact, and this spring-arm is so located on the face of the clock as to be engaged by the seconds-hand l of the clock and held from engagement with the stationary point during one-half of the revolution of the hand or for half a minute. Hence the bell will ring for every alternate half-minute and be silent the intervening thirty seconds.

If desirable, the locomotive can be provided with a source of electricity that can be thrown into or out of the circuit when desired or in case of necessity.

From the foregoing it will be observed that if the signal-conductors be cut off from the source a vehicle on that block will also be thrown out of communication with the source and the engineer will be notified of danger. This fact is taken advantage of, as shown in Fig. 3, to notify the engineer of a train approaching on the main track if the switch is closed to throw his train onto the side track m, and this is accomplished by means of a coiled spring n in electrical communication with the signal line conductor d and bearing constantly against the switch-rail o, so that when the switch-rail is out of contact with the main-line rail (which is connected with one pole of the battery) the parts and current are normal and the circuit would be closed through a vehicle on that block; but when the switch is closed and the switch-rail is in contact with the main-track rail the battery is short-circuited and cut from the two signal line conductors, being short-circuited from one pole through conductor d, spring n, switch-rail, and main rail to other pole.

In Fig. 4 an arrangement is shown for indicating to the engineer of an approaching train if a bridge has been washed away or is in a dangerous condition. The "blocks" on each side of the bridge are so arranged that they will end with the bridge. The conductors d on each side of the bridge and belonging to the two blocks are continued over the bridge side by side, as shown, and a short distance apart, so that the two conductors will end on opposite sides of the bridge, and each block at the end of its conductors is provided with a battery, as shown. Each conductor d at about the center of the bridge is divided into two sections, the ends of which are electrically connected by a short section of wire p, secured to the section ends to withstand sufficient strain, to connect the parts, unless the bridge is injured or sinks or is destroyed, when of course the conductors separate and the batteries are cut out of their respective blocks, and a locomotive upon entering such a block is notified of danger by his alarm ceasing to ring.

It is evident that various changes might be resorted to in the form and arrangements of the parts described without departing from the spirit and scope of my invention.

What I claim is—

1. In an electric railway-signal, a vehicle containing a circuit connected with a line conductor, in combination with an electric alarm in said circuit and a continuously-operating circuit maker and breaker in said circuit, consisting of a stationary contact on a clock and a spring movable contact arranged to be intermittingly lifted from engagement with said stationary contact by a hand of the clock, as set forth.

2. In an electric railway-signal, the combination, with a line-circuit, of a switch-rail and a stationarily-mounted coiled contact-spring separate from and arranged in the path of said switch-rail parallel with the plane in which said rail moves to electrically engage said switch-rail, substantially as described.

3. In an electric railway-signal, the combination of a line conductor and a rail of the main track insulated from said conductor, a source of electricity having its opposite poles connected, respectively, with said rail and conductor, and a switch-rail to swing into or out of electrical engagement with said rail of the main track, said switch-rail being in constant electric connection with said conductor, substantially as described.

4. In an electric railway-signal, the combination of a pair of separate line conductors divided into separate blocks, a source of electricity for each block, the two conductors of each block forming opposite terminals of its source, a switch, and a circuit-closer at the switch, said parts being so arranged that when the switch is open the parts are normal, but when the switch is thrown to break the continuity of the main track the circuit-closer is operated and the source is short-circuited and cut from its block, substantially as described.

5. In an electric railway-signal, the combination of a line conductor divided into separate blocks, a bridge or trestle over which the two blocks pass and with which they end, a source of electricity at or near the bridge for each block and normally forming an open circuit over the same, and a circuit-breaker at the bridge and in each block so arranged that if the bridge is deranged or sinks each block will be cut off from its source of electricity.

6. In an electric railway-signal, the combination of two separate sections of a line conductor extending over a bridge or trestlework from opposite ends and respectively ending at or near opposite ends of the bridge, each conductor being so constructed that it will electrically break under longitudinal strain, and a source of electricity for each conductor-section, arranged substantially as set forth.

7. In an electric railway-signal, the combination of a conductor-block extending over a bridge or trestle, a source of electricity for said block and constantly connected therewith, said block being provided with a circuit-breaker to cut the source from said block when the bridge sinks or is broken, and a vehicle on the track containing a partial circuit, including an electric alarm and adapted to close a circuit through itself, said block, and its source, substantially as and for the purpose set forth.

8. In an electric railroad-signal, the separate blocks along the track, each provided with its own source of electricity, in combination with a vehicle on the track having a partial circuit closing a circuit through itself, the block on which the vehicle is located, and its source, an electrical alarm in said partial circuit, a continuously-operating circuit maker and breaker in said partial circuit intermittingly making and breaking said circuit for the purpose set forth, and clock-work driving said circuit maker and breaker.

9. In an electric railroad-signal, the series of separate blocks along the track, each block being provided with a source of electricity, in combination with a vehicle on the track, containing a partial circuit arranged to close a circuit through itself and the block on which it is located and its source, an electric alarm in said partial circuit, a circuit maker and breaker in said partial circuit, means for continuously operating the same, a push-button or breaker, and a switch in said partial circuit.

10. An electric railroad-signal consisting of a single insulated conductor extending along the track and divided into separate blocks, the series of rails on one side electrically connected and divided into like blocks, a source of electricity for each block, having opposite poles connected, respectively, to corresponding sections of the conductor and rail, a vehicle on the track, having a single partial circuit electrically connecting the conductor and rail-sections of the block on which the vehicle is located and closing a circuit through itself, said block, and its source, and an electric audible alarm in said partial circuit, so that said alarm is operated when the blocks are normal and indicates danger by ceasing to operate.

In testimony that I claim the foregoing as my own I affix my signature in presence of two witnesses.

WILLIE COWLES WALTER.

Witnesses:
  O. E. DUFFY,
  C. M. WERLE.